(12) United States Patent
Gschwind et al.

(10) Patent No.: US 7,512,772 B2
(45) Date of Patent: Mar. 31, 2009

(54) SOFT ERROR HANDLING IN MICROPROCESSORS

(75) Inventors: Michael Karl Gschwind, Chappaqua, NY (US); Robert Philhower, Valley Cottage, NY (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 11/620,869

(22) Filed: Jan. 8, 2007

(65) Prior Publication Data

US 2008/0168305 A1      Jul. 10, 2008

(51) Int. Cl.
G06F 11/16    (2006.01)
(52) U.S. Cl. .............................. 712/227; 714/6; 714/7; 714/30; 714/42; 714/54
(58) Field of Classification Search ................. 712/227; 714/6, 7, 25, 30, 42, 54
See application file for complete search history.

(56) References Cited

U.S. PATENT DOCUMENTS

| | | | | |
|---|---|---|---|---|
| 4,584,681 A | * | 4/1986 | Singh et al. ................... | 714/7 |
| 4,823,252 A | * | 4/1989 | Horst et al. ................... | 714/7 |
| 5,269,017 A | * | 12/1993 | Hayden et al. ................ | 714/15 |
| 5,293,613 A | * | 3/1994 | Hayden et al. ................ | 714/15 |
| 5,659,678 A | * | 8/1997 | Aichelmann et al. .......... | 714/25 |
| 5,692,121 A | * | 11/1997 | Bozso et al. .................. | 714/13 |
| 6,625,749 B1 | * | 9/2003 | Quach .......................... | 714/10 |
| 6,625,756 B1 | * | 9/2003 | Grochowski et al. .......... | 714/17 |
| 6,785,847 B1 | * | 8/2004 | Jordan et al. .................. | 714/37 |
| 7,328,376 B2 | * | 2/2008 | McGuire et al. .............. | 714/48 |
| 7,340,643 B2 | * | 3/2008 | Grochowski et al. .......... | 714/11 |
| 7,370,230 B1 | * | 5/2008 | Flake ........................... | 714/10 |
| 7,418,635 B2 | * | 8/2008 | Schulstad ..................... | 714/45 |
| 2006/0156177 A1 | * | 7/2006 | Kottapalli et al. ............ | 714/758 |
| 2006/0282755 A1 | * | 12/2006 | Oh .............................. | 714/801 |
| 2008/0082893 A1 | * | 4/2008 | Wang ........................... | 714/758 |

OTHER PUBLICATIONS

Smolens et al., "Reunion: Complexity-Effective Multicore Redundancy", 39th Annual IEEE/ACM International Symposium on Microarchitecture, IEEE, Dec. 2006, pp. 223-234.*

Mukherjee et al. "The Soft Error Problem: An Architectural Perspective", 11th International Symposium on High-Performance Computer Architecture, IEEE, Feb. 12-16, 2005, pp. 243-247.*

* cited by examiner

*Primary Examiner*—William M Treat
(74) *Attorney, Agent, or Firm*—Cantor Colburn LLP; Rafael Perezs-Pineiro

(57) ABSTRACT

A method for low cost handling of soft error in a microprocessor system is described, which includes detecting a soft error, indicating a register having soft error to an instruction unit, flushing microprocessor pipelines, identifying locations from which to recover a good architectural state based on execution resources used for processing, and recovering the good architectural state from duplicate execution resources used for processing.

2 Claims, 5 Drawing Sheets

SOFT ERROR HANDLING IN MICROPROCESSORS

BACKGROUND OF THE INVENTION

1. Field of the Invention

This invention relates to a new method to address soft error rates without degrading cycle time and without adding significant design complexity, power consumption or area (thus controlling design, debug and manufacturing costs).

2. Description of Background

The semiconductor industry relies on aggressive scaling of device sizes to deliver continuing cost reductions of semiconductor products such as microprocessors. CMOS scaling is based upon a technique first described by Dennard et al. [JSSC 1974]. A component of CMOS scaling is the lowering of supply and threshold voltage, making circuits more susceptible to soft errors.

While in the past, a wide range of products have been able to ignore the impact of soft errors because of their low occurrence rate, increasingly they must address these issues to provide acceptable failure rates as expressed by MTBF ("mean time between failures") as supply and threshold voltages continue to be scaled down. Thus, while in the past, only high-end reliable servers such as IBM Mainframes in the System Z family have provided robust soft error protection, lower end high-volume products must start to address such issues.

Alas, while high-end servers can provide robust soft error resilience by adding additional features, such as recovery units, high-volume parts must achieve soft error resilience using lower cost options. An exemplary description of such of robust soft error resilience in high-end servers follows.

Referring now to Prior Art FIG. 1, a state of the art microprocessor is depicted. A state of the art microprocessor typically includes a high-bandwidth instruction fetch front end; a highly accurate dynamic branch predictor; instruction decode and dispatch logic operating on a plurality of instructions simultaneously; several issues queues corresponding to several execution pipelines; several register files providing operands for the several execution pipelines; and in-order completion logic.

Referring now to Prior Art FIG. 2, there a common technique of duplicating a register file to increase the number of read ports is illustrated. In accordance with this implementation, a single architectural register file (containing renames or not) is implemented using multiple copies. Each copy receives the results from all execution pipelines and writes them to the corresponding target registers, and provides operand read ports for a subset of the execution pipelines, thereby providing a larger aggregate number of read ports than could otherwise be provided.

In addition to providing additional read ports, register file duplication also alleviates congestion and wire delay, by providing multiple physical locations for reading data values. In one use, duplicated register files also bridge a latency gap between execution pipelines, by allowing for extra delay to write back results in remote register files, thereby allowing an implementation to cope with wire delays common in today's complex high-frequency designs.

In accordance with one potential mode, instruction decode logic can indicate that an instruction should be dispatched to a specific cluster (cluster 1 and cluster 2 corresponding to the execution pipelines associated with the first and second register file copy, respectively). This decode-based steering is advantageous in a clustered microarchitecture with variable update delays taking a longer latency to write computation results to another register file copy. Thus, decode can steer dependent operations to the same cluster and reduce the impact of wire delay on execution schedules. In another mode dealing with clustered microarchitectures, some operations (e.g., a divide, or some control registers) may only be provided in one cluster but not another cluster. Decode can steer these operations using said steering indication. In one implementation we refer to this as the cluster steering indicator.

Referring now to Prior Art FIG. 3, there is shown an exemplary state of the art recovery mechanism as used in highly reliably computer systems. A Buffer Control Element 310 provides a common interface to the cache hierarchy (indicated as L1 cache 315). Two copies of a computational core 320 and 330 (indicated as I-Unit for instruction decode and dispatch units and E-unit for instruction execution unit) independently process the same instruction stream provided by the BCE to both copies of the computational core. Outputs of the duplicated computational core units are compared (indicated by box labeled "=" 340), and retired in the R-unit 350, and/or used by the Buffer Control Element to initiate memory subsystem requests.

According to this architecture, the R-unit provides a highly protected reference copy of the entire microprocessor state, and can be used to re-initiate execution, when a fault has been discovered, by loading the state into the register files of both cores.

According to other implementations, alternate designs are provided, such as using multiple executions in a shared data path to provide correctness determination, or by protecting computation results with parity or ECC protection. Depending on implementation details, arithmetic and logic computation elements can generate results including parity or ECC indication to further protect the computed data.

According to the described prior-art embodiments, a full copy of the entire state is to be maintained in the R-unit to provide a sound restart point when errors are detected using the described or any other known or unknown error detection mechanisms.

In accordance with these mechanisms, when an error is detected, recovery is performed in accordance with Prior Art FIG. 4. The method 400 commences when an error condition is detected in step 410. Recovery logic of R-unit 350 inhibits further execution in step 420. R-unit flushes all pipelines and other associated state in step 430. Modified memory data corresponding to committed known good state is retired to the memory subsystem.

After prior state has been purged from the microprocessor, R-unit initiates a recovery sequence and control is passed to special purpose recovery logic in step 440. In step 450, in accordance with embodiments of R-unit based recovery methods, dedicated data paths, either integrated in preexisting scan test logic, or otherwise integrated in the design), allows R-unit recovery logic to write and update each and every architected state bit in the microprocessor. In step 460, the state update has completed, and the microprocessor restarts execution from the recovered state.

Thus, as is evident from the description contained herein, while the R-unit provides superior fault tolerance by providing means for checking correctness and recovering when incorrect execution is determined, the costs are significant, due to the increased area for duplicating the computational core, storing a copy of the architected state distinct and separate from the execution paths, providing special purpose control and recovery paths based on providing a mode of operation to allow R-unit control, and providing special data paths to transfer data to the R-unit under normal execution and to write and update every architected state bit during the recovery sequence.

To continue delivering cost reductions by continuing to shrink device sizes in new technologies, what is needed in the art is a new method to address soft error rates. What is further needed in the art are methods and apparatus to provide such resilience without adding significant design complexity, power consumption or area (thus controlling design, debug and manufacturing costs).

SUMMARY OF THE INVENTION

The shortcomings of the prior art are overcome and additional advantages are provided through the provision of a method for handling soft error in a microprocessor system, which includes detecting a soft error, indicating a register having soft error to an instruction unit, flushing microprocessor pipelines, identifying locations from which to recover a good architectural state based on execution resources used for processing, and recovering the good architectural state from duplicate execution resources used for processing. Advantageously, the preceding method provides for low cost soft error recovery without degrading cycle time.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides effective soft error handling in microprocessors without adding significant design complexity, power consumption or area (thus controlling design, debug and manufacturing costs).

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Prior Art

Prior Art

Prior Art

The detailed description explains the preferred embodiments of the invention, together with advantages and features, by way of example with reference to the drawings.

DETAILED DESCRIPTION OF THE INVENTION

Herein, a systematic approach is provided for handling soft error in a microprocessor system that increases reliability of low-cost, high-volume parts. However, according to the present method, reliability in said high-volume low cost designs is not based on the provision of distinct recovery unit (R-unit) or state written for the purpose of providing a separate recovery state used only during a recovery operation.

Rather, such method provides reliability by exploiting a pre-existing duplication of resources. This increases reliability, without the cost, area, power dissipation and complexity increase associated with the design of a distinct R-unit. In accordance with this method, reliability support is integrated in the execution paths to detect errors, and a simple recovery method based on pre-existing data flow is triggered. Thus, the only costs beyond a traditional design not offering improved reliability features relate to the ability to inject a recovery sequence into the data path.

In one exemplary embodiment, the recovery sequence is generated using one of a microcode ROM and a state machine, which generate internal operations (iops) corresponding to microarchitectural primitives implemented for execution.

In another exemplary embodiment, data paths are enhanced to provide one of parity and ECC protection by generating results and ECC during a compute operation, and by providing a pervasive checking function to detect corrupt data. In another exemplary embodiment, parity and ECC checking is restricted to the most vulnerable elements, such as register file state.

Figure 1:
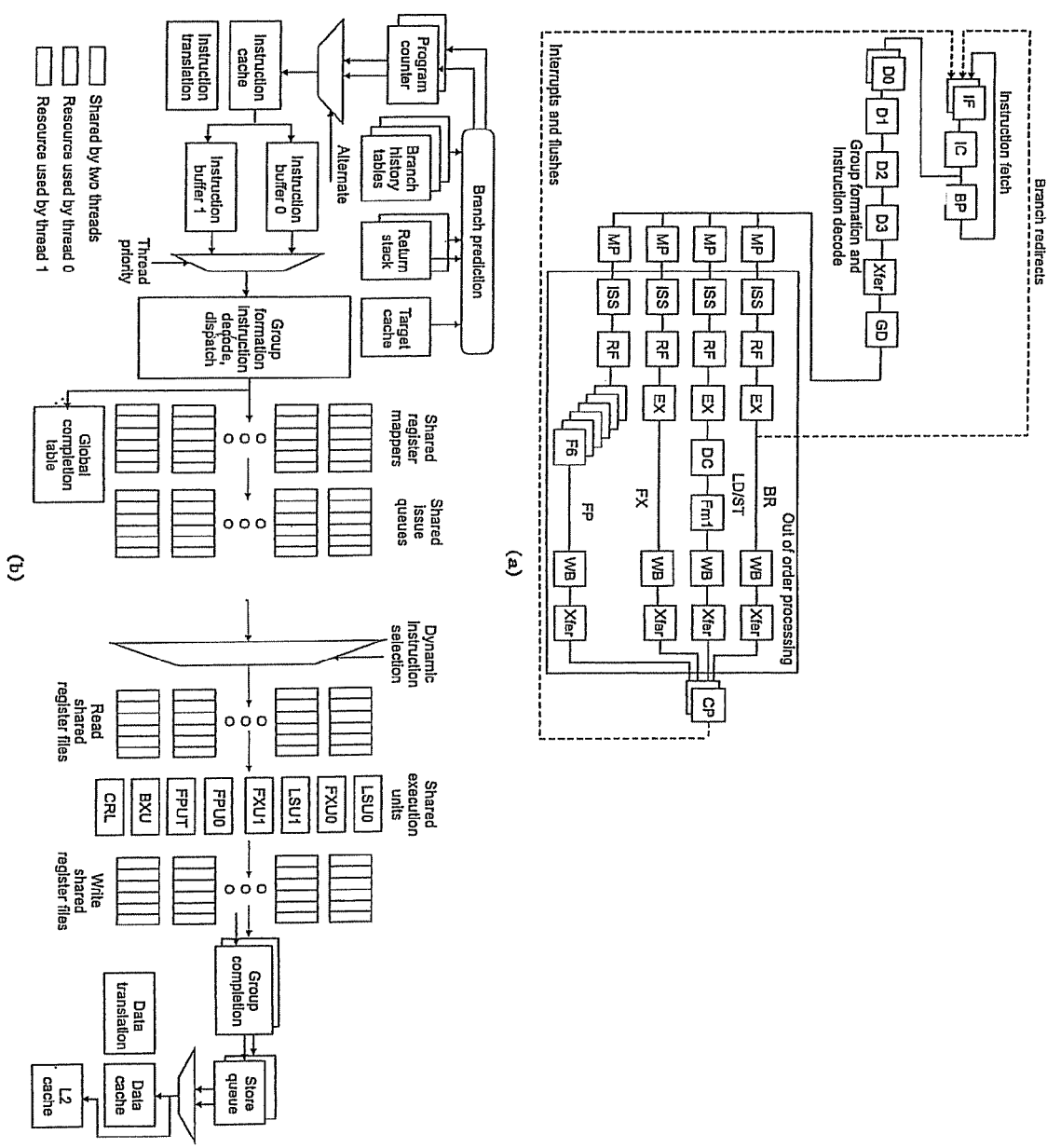
FIG. 1 shows a state of the art microprocessor in accordance with Sinharoy et al., POWER5 system microarchitecture, IBM Journal of R&D, Volume 49, Number 4/5, 2005.
Figure 2:
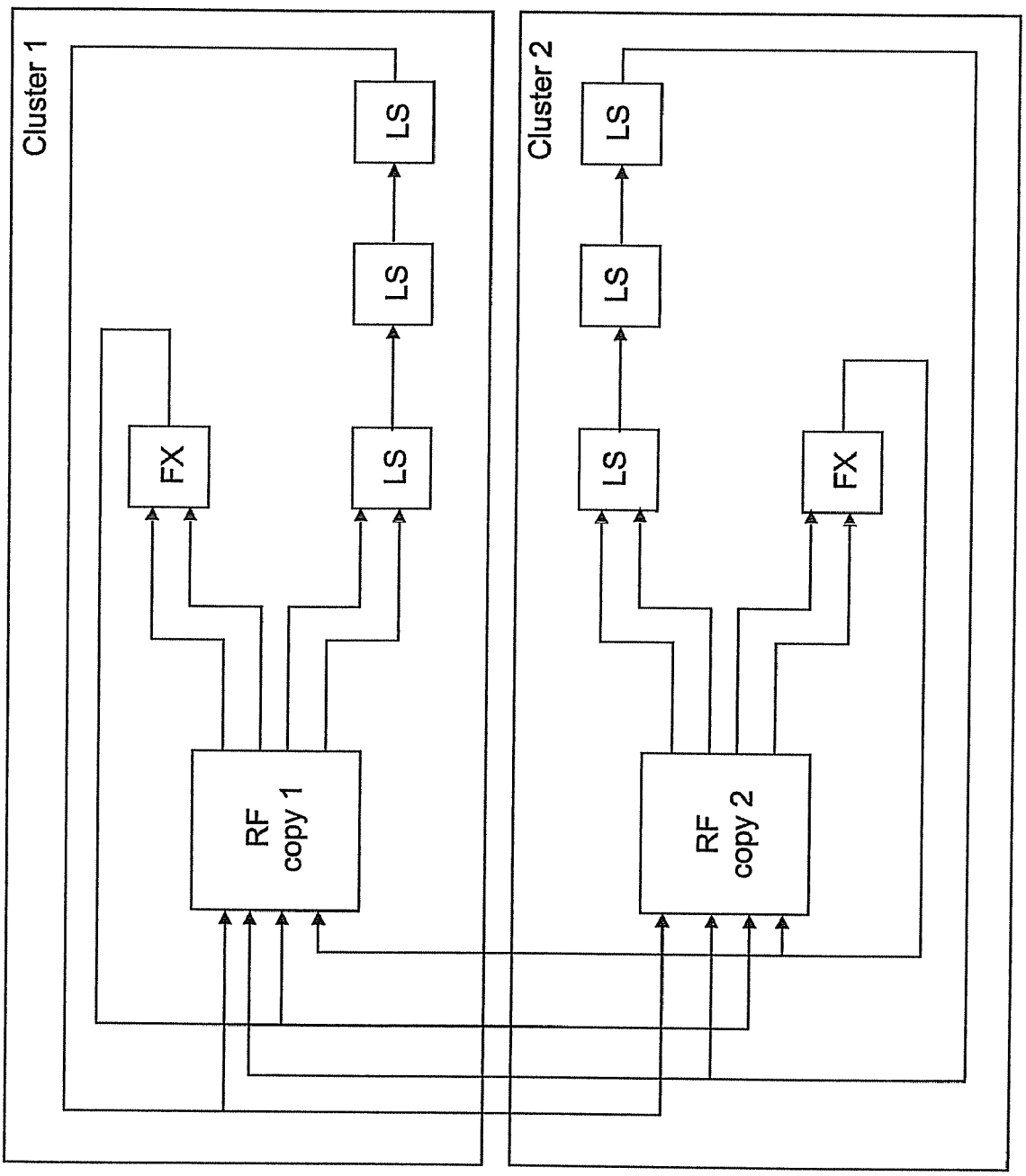
FIG. 2 shows an exemplary implementation of a microprocessor having duplicated register files to increase the number of register file ports.
Figure 3:
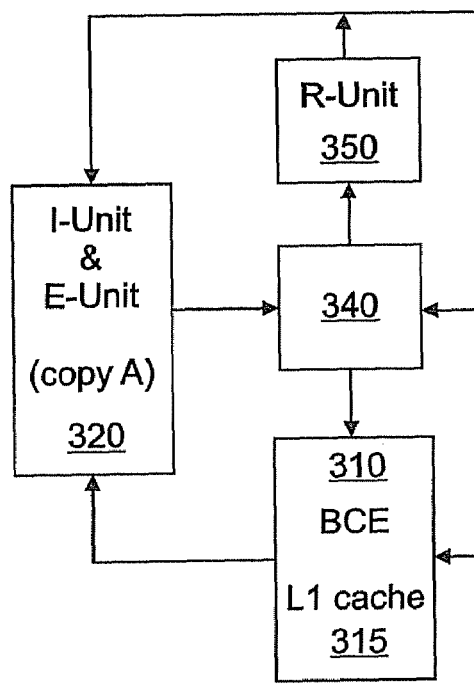
FIG. 3 shows a state of the art microprocessor design using an R-unit as described by Webb and Liptay, "A High-Frequency Custom CMOS S/390 Microprocessor", 1997 International Conference on Computer Design.
Figure 4:
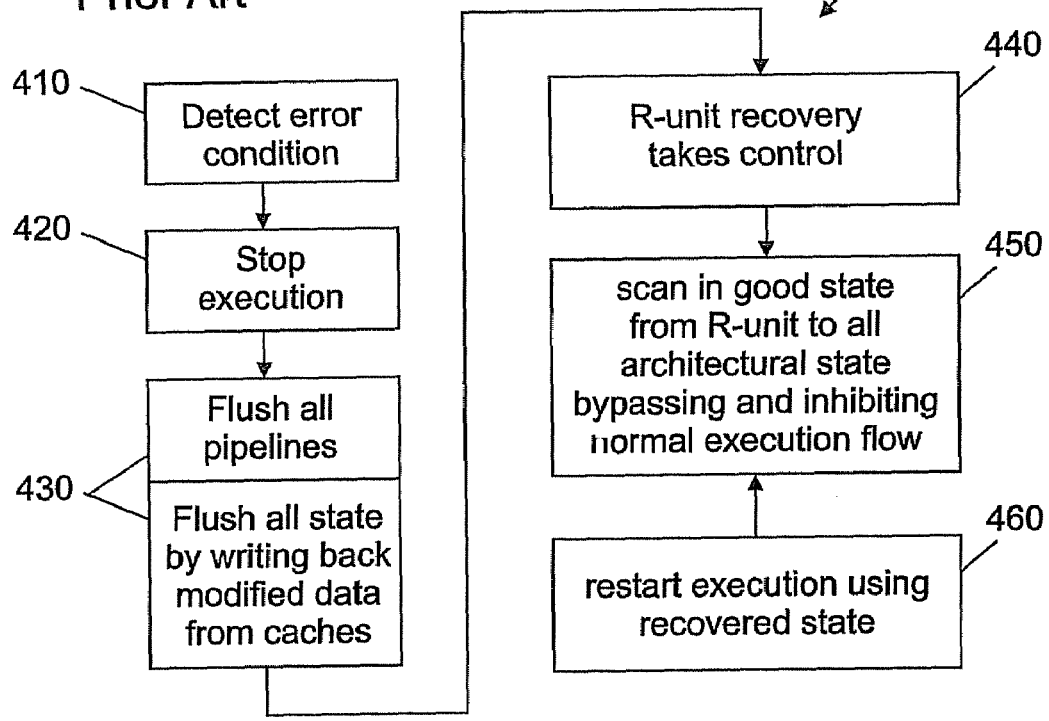
FIG. 4 shows a recovery sequence using R unit.
Figure 5:
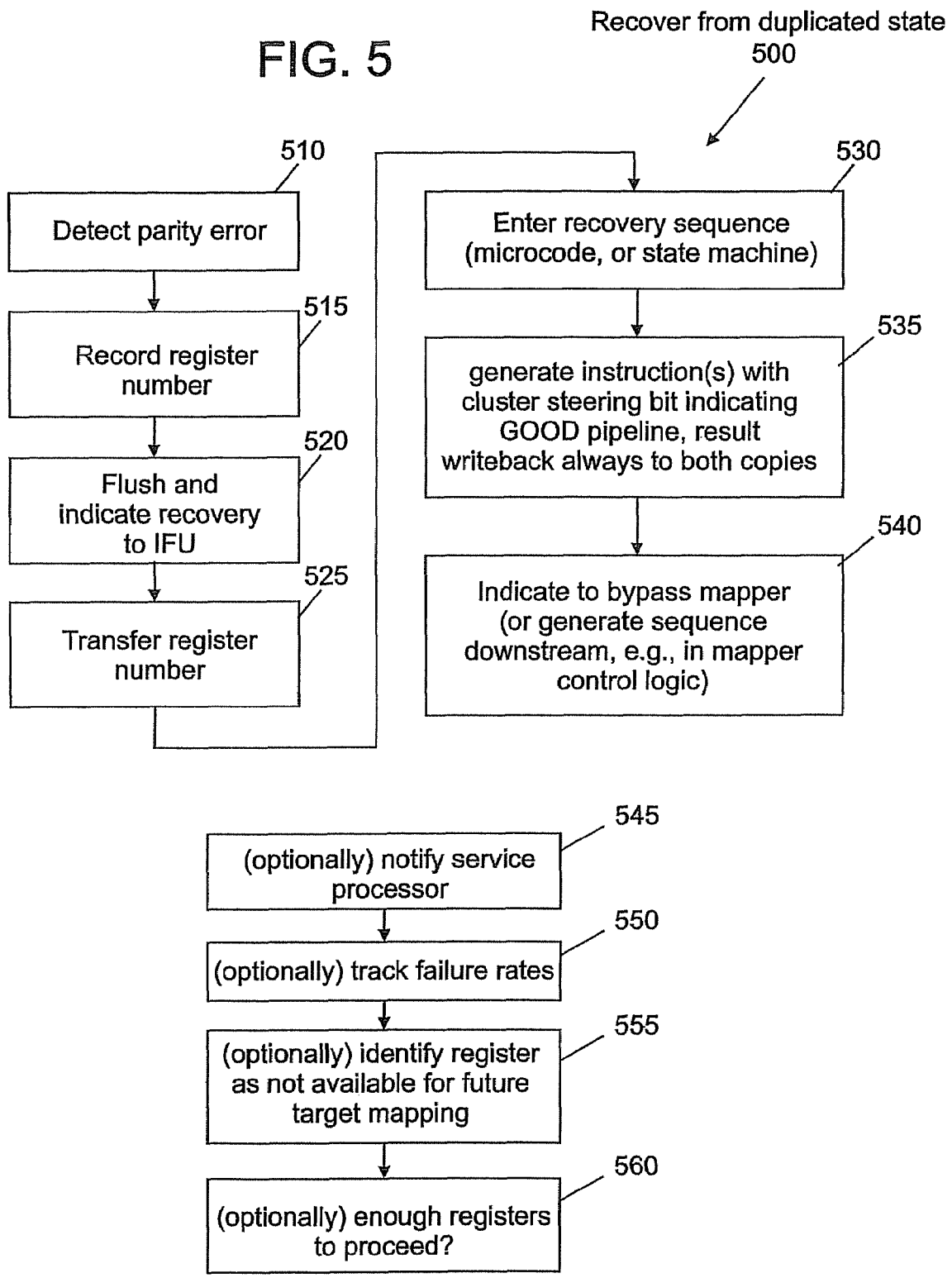
FIG. 5 shows an exemplary recovery sequence.

Referring now to FIG. 5, a reliability method 500 is illustrated in accordance with the presently described method. In step 510, a parity error is detected during the reading of a register. In step 515, the failing register number is recorded. In an exemplary embodiment, the register number corresponds to an architected register number. In another exemplary embodiment, the register number corresponds to a physical register number.

Referring to step 520 of FIG. 5, the pipeline is flushed, removing at least the instruction having experienced the error, as well as all subsequent instructions from the issues queues and execution pipelines. The Instruction Fetch Unit (IFU) is requested to perform the recovery action. In step 525, the failing register number is transferred to a recovery buffer. In an exemplary embodiment, step 525 is omitted.

Referring to step 530 of FIG. 5, recovery logic located in an instruction fetch, decode or sequencing unit is initiated. In accordance with the present method, recovery logic corresponds to a microcode ROM or state machine generating internal operations (iops) having execution flow based on the execution data paths provided in the microarchitecture.

Referring to step 535 of FIG. 5, a register to register move iop is generated indicating the failing register as source and target. The iop is further associated with a cluster steering bit to cause execution in a pipeline that did not generate the error condition. Thus, in accordance with this embodiment, a register copy instruction will be executed, reading the good state from a register file, e.g., register file copy 2, using its associated execution pipeline executing register copy, and write updating both a first and a second register file copy, and thereby ensuring that both register file states have the correct value.

A variety of implementation options are possible, as shown by exemplary step 540. In accordance with the exemplary step 540, a failing physical register number has been recorded in step 540, and the generated register copy iop contains a physical register number. In one exemplary embodiment, this is indicated to the register name mapper to bypass register renaming on the copy iop, generating a read and a write to the indicated physical address.

In another exemplary embodiment, a logical (architected) register number is provided, and register renaming occurs, selecting the value from a physical register number in the good cluster based on the cluster steering bit, and allocating a new physical register to write a new renamed copy.

In yet another exemplary embodiment, the recovery sequence is generated at a point beyond the register renaming logic, and thereby automatically suppressing register renaming on the referenced value.

In one execution sequence, both copies of a register may have been corrupted. If this occurs, the recovery sequence will cause a parity error during the recovery sequence. In one exemplary embodiment, a machine check or other error indicating step is raised when this condition is encountered.

In other exemplary embodiments, other recovery techniques can be used in this situation, including but not limited to, entering non-speculative execution when the corrupt value corresponds to a speculative execution path, and using the corrupt data on non-speculative paths, among others.

Referring to step 545 of FIG. 5, optional notification of the soft error is provided, e.g., in an error buffer, by providing an indication to the operating system or hypervisor software, or to a service processor.

In step 550 of FIG. 5, failure rates are optionally tracked to provide future indication of failing hardware, and to allow preemptive hardware replacement when a hardware component is suffering excessive failure rates.

In accordance with an exemplary embodiment, optional step 555 removes a physical register from the register free list. In one embodiment, this is performed after the first failure. In another embodiment, this is performed after a register has suffered more than one failure. In one embodiment, this threshold is configurable, and can be changed by writing, e.g., a configuration register, scanning a value into a mode scan ring, or another configuration action. In another embodiment, this is a design parameter and cannot be controlled.

When a register has been removed in optional step 555, optional step 560 determines whether enough physical registers remain for the processor to work correctly. If there is an insufficient number of registers an unrecoverable error is indicated. In one embodiment, this unrecoverable error triggers the service processor to preserve the architectural state for later resumption on another processor in a multi-processor system.

Figure 6:
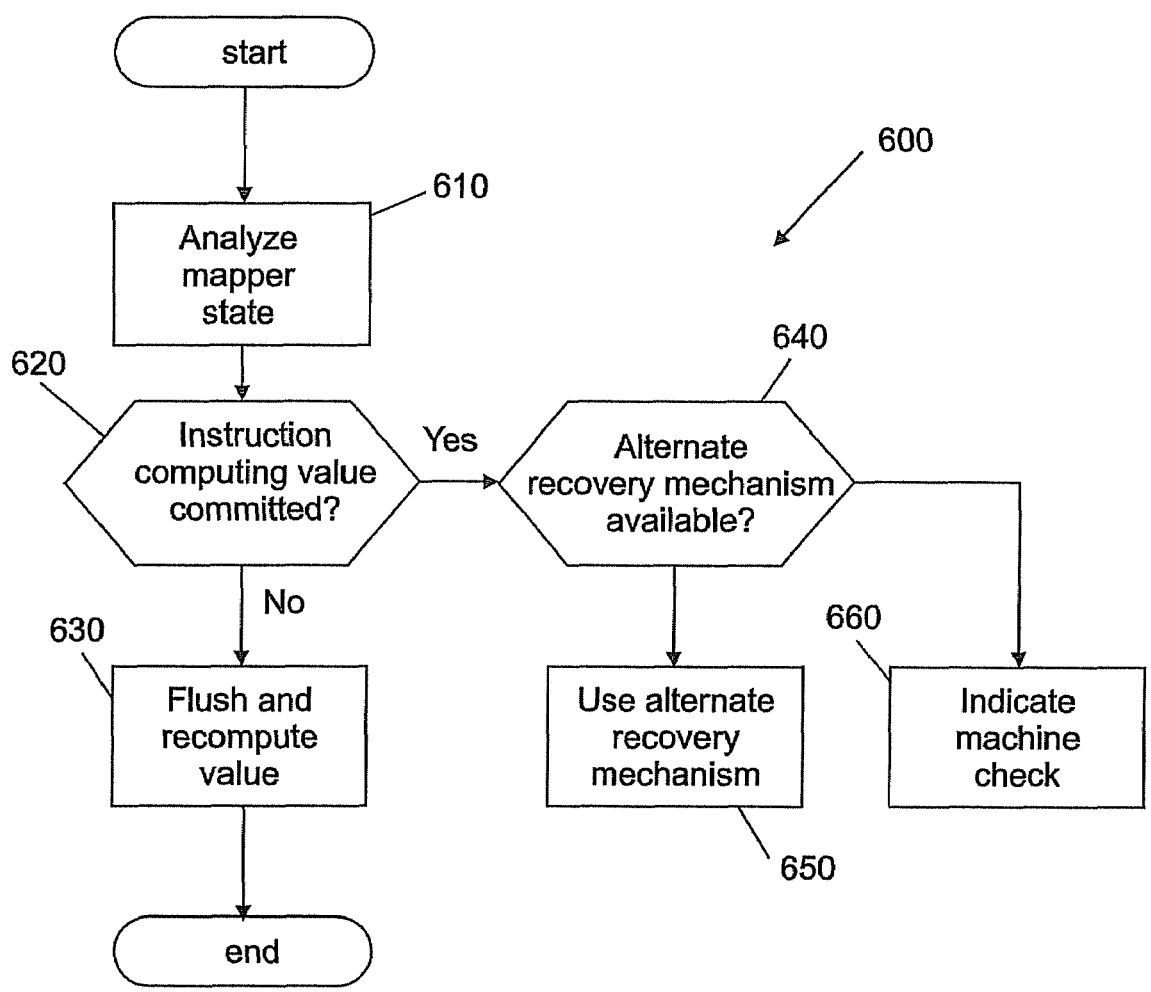
FIG. 6 shows a recovery mechanism based on re-computing a corrupted value.

Referring now to FIG. 6, in another method for improved reliability, when a value is determined to be corrupt (e.g., a corrupt operand is read), the method 600 is entered. In one embodiment, method 600 is used in conjunction with method 500 to provide increased reliability, e.g., for register files which are not duplicated, or when all physical copies of a value are corrupt.

Referring to step 610 of FIG. 6, the logical-to-physical register mapper state (or other such state) is analyzed to determine whether the instruction having computed the corrupted value as its output has been committed yet.

Referring to test 620 of FIG. 6, the outcome is tested, and if the instruction is still in flight, control transfers to step 630. Otherwise control passes to step 640. In step 630, at least the instruction having computed the corrupted value and its successor instructions are flushed from the pipeline. Execution resumes to recompute a non-corrupt value. The method ends.

In step 640, re-execution cannot be used to recompute a corrupt value. If an alternate mechanism is available, control transfers to step 650. Otherwise control transfers to step 660.

In step 650, an alternate method for recovery is used.

In step 660, no recovery methods are available when a corrupt value has been found. A machine check or other error notification condition is signaled. Those skilled in the art will understand that the method 600 can be used in conjunction with recording and decision methods for proving early fail indications, removal of repeatedly failing hardware elements, logging and so forth, as has been described for method 500 in steps 545 to 560.

In another aspect of recovery, data stored in instruction queues (such as instruction buffers, issue queues, global completion tables, and reservation stations) are detected as corrupted by checking parity (or other such data integrity mechanisms like ECCs, CRCs, etc). In accordance with FIGS. 5 and 6, a flush is triggered, allowing to read corrupted data from architectural state (specifically, instruction caches or memory for instructions, and register files for data values), but no register value recovery is necessary.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for handling soft error in a microprocessor system, comprising:
    detecting a register file state soft error with a parity or ECC checking,
    indicating a register having soft error to an instruction unit,
    flushing microprocessor pipelines by removing the instruction having experienced the error as well as all subsequent instructions from issue queues and execution pipelines,
    identifying locations from which to recover a good architectural state based on execution resources used for processing; and
    recovering said good architectural state from duplicate execution resources used for processing, wherein recovery logic that is located in an instruction fetch, decode or sequencing unit is initiated, a register to register move iop is generated indicating the failing register as source and target, the iop is associated with a cluster steering bit to cause execution in the pipeline that did not generate the error condition, and a register copy instruction is executed, reading the good state from a register file, using its associated execution pipeline executing register copy, and write updating both a first and second register file copy, thereby ensuring that both register file states have the correct value.

2. The method of claim 1, wherein a logical-to-physical register mapper state is analyzed to determine whether an instruction having computed the error, or corrupted value as its output, has been committed at a point in time, wherein if such has not been committed, the instruction having computed the corrupted value and its successor instructions are flushed from said pipeline.

* * * * *